United States Patent
Peraza Cano

(10) Patent No.: US 9,200,613 B2
(45) Date of Patent: Dec. 1, 2015

(54) SEMI-SUBMERGED DEVISE FOR ABSORBING THE ENERGY OF THE WAVES

(71) Applicant: Jose Luis Peraza Cano, Santa Cruz (ES)

(72) Inventor: Jose Luis Peraza Cano, Santa Cruz (ES)

(*) Notice: Subject to any disclaimer, the term of this patent is extended or adjusted under 35 U.S.C. 154(b) by 0 days.

(21) Appl. No.: 14/365,894

(22) PCT Filed: Dec. 11, 2012

(86) PCT No.: PCT/ES2012/070859
§ 371 (c)(1),
(2) Date: Jun. 16, 2014

(87) PCT Pub. No.: WO2013/093149
PCT Pub. Date: Jun. 27, 2013

(65) Prior Publication Data
US 2014/0369864 A1 Dec. 18, 2014

(30) Foreign Application Priority Data
Dec. 19, 2011 (ES) .................................. 201132039

(51) Int. Cl.
*E02B 9/08* (2006.01)
*F03B 13/16* (2006.01)
*F03B 13/24* (2006.01)
*F03B 13/18* (2006.01)
*F04B 35/00* (2006.01)

(52) U.S. Cl.
CPC . *F03B 13/24* (2013.01); *E02B 9/08* (2013.01); *F03B 13/187* (2013.01); *F04B 35/004* (2013.01); *F05B 2240/97* (2013.01); *F05B 2260/42* (2013.01); *Y02E 10/38* (2013.01)

(58) Field of Classification Search
CPC ....... E02B 9/08; Y02E 10/38; F03B 13/1815; F03B 13/18; F03B 13/16
USPC ............................................................ 405/76
See application file for complete search history.

(56) References Cited

U.S. PATENT DOCUMENTS

| | | | | |
|---|---|---|---|---|
| 1,523,031 | A * | 1/1925 | Mitchell, Jr. ................... | 417/333 |
| 2,715,366 | A * | 8/1955 | Vartiainen ...................... | 417/333 |
| 2,871,790 | A * | 2/1959 | Weills ............................. | 417/333 |
| 4,698,969 | A * | 10/1987 | Raichlen et al. ................ | 60/502 |
| 6,132,180 | A * | 10/2000 | Kojima .......................... | 417/333 |
| 7,242,106 | B2 * | 7/2007 | Kelly .............................. | 290/42 |
| 7,585,131 | B2 * | 9/2009 | Oigarden et al. ............... | 405/76 |
| 2006/0233613 | A1 * | 10/2006 | Welch et al. .................... | 405/76 |
| 2007/0130929 | A1 * | 6/2007 | Khan et al. ...................... | 60/398 |
| 2008/0260548 | A1 * | 10/2008 | Ahdoot .......................... | 417/333 |
| 2009/0121486 | A1 * | 5/2009 | Ganley ........................... | 290/53 |
| 2011/0225964 | A1 * | 9/2011 | Welch et al. .................... | 60/497 |

FOREIGN PATENT DOCUMENTS

FR  2479343  * 10/1981

* cited by examiner

*Primary Examiner* — Frederick L Lagman
(74) *Attorney, Agent, or Firm* — Gary J. Gershik; Cooper & Dunham LLP

(57) ABSTRACT

Semi-submerged device for the use of the energy of the waves, comprising at least one moving assembly formed by a buoy (1) attached to a rod (2), that moves through a cylinder (4) equipped with a one-way bottom valve (6), and said moving assembly is located inside the space delimited by a fixed supporting structure comprising at least three interconnected hollow vertical tubes (14), one of them equipped with a valve (7) and another with a valve (16), and each with an air chamber (15). One of said tubes (14) is connected to the cylinder (4) through the valve (7), It also comprises a top platform (18) located on the tubes (14) on the surface of the water.

6 Claims, 3 Drawing Sheets

SEMI-SUBMERGED DEVISE FOR ABSORBING THE ENERGY OF THE WAVES

CROSS-REFERENCE TO RELATED APPLICATIONS

This application is a §371 national stage of PCT International Application No, PCT/ES2012/070859, filed Dec. 11, 2012, claiming priority of Spanish Patent Application No.P201132039, filed Dec. 19, 2011, the contents of each of which are hereby incorporated by reference in their entirety.

OBJECT OF THE INVENTION

The present invention is related to a semi-submerged device for absorbing the energy of the waves, through the vertical motion of the waves, that causes the raising and lowering of a buoy that operates a rod that accumulates pressurized water in the interior of the supporting structure of the device itself. It comprises a structure with most of its elements fixed and a small movable part, without the need for any type of mooring to the sea bottom.

The part of the device structure that is submerged in the water creates a protected space, while the part that is on the surface can be used for other purposes.

BACKGROUND OF THE INVENTION

A wave is all kinds of periodic oscillation that occurs on the surface of the sea. The waves occur at sea, caused by wind, storms, tsunamis, forces of attraction, gravitation, etc. However, from all of them, the wind is the one that generates the most common waves and with higher energy density.

The greater the height of the waves, the greater is the amount of energy that can be extracted from them. The height of the waves depends on three wind parameters: the speed, its persistence over time, and the stability of its direction.

In the state of art there have been developed a plurality of devices for capturing this large amount of wave energy. The devices for taking advantage of the energy stored in the waves must capture the kinetic and/or potential energy of the waves and convert it into another form of useful energy. However, there are some problems in the design of such devices. For example, the irregularity in the amplitude, phase and direction of the waves makes it difficult to obtain the maximum efficiency of the apparatus over the full range of frequencies of excitation, while extreme weather conditions are not favourable either.

Thus, the devices for extracting the energy of the waves are classified according to different criteria. Depending on the relative position of the devices with respect to the coast, there can be distinguished devices located on the coast, close to the coast and on the high seas. Depending on their ability to extract energy, they can be small, medium or large capacity devices. If they are classified by their geometry and position relative to the waves, there can be identified totalizers or terminators, with the main axis parallel to the waves, i.e., perpendicular to the direction in which the waves move, extracting the energy of the waves at once; the attenuators are devices the main axis of which is parallel to the direction of motion of the waves, extracting the energy progressively; and point collectors, which are isolated devices with reduced dimensions that take advantage of the concentration and convergence of the waves. By their relative motion with respect to the waves, devices with structure fixed to the coast or to the sea bottom and floating or semi-submerged apparatuses can be identified.

Fixed structure devices are anchored to the sea bottom or the coast, such that the main structure does not move with the sea, however, these devices have elements that can move with respect to the fixed structure when the waves act on them, converting the wave energy into mechanical energy, which is transformed into another form of useful energy. These devices are easier to manufacture and maintain than floating devices, but they have other drawbacks such as the small number of coastal locations wherein they can be installed or the lower capture of energy than floating devices that are installed away from the coast.

Devices based on oscillating water columns consist of a hollow, partially submerged structure that is open to the sea at the bottom. This structure contains an air column at the upper part of a water column. When the waves act on the apparatus they cause the water column to go up and down, with which the air column is compressed and decompressed alternately. In other words, it takes advantage of the principle of resonant cavity. If this trapped air is allowed to flow to and from the atmosphere through the blades of a turbine, mechanical energy can be extracted from the system and used to generate electricity through a generator mechanically attached to the turbine. Generally used turbines are the so-called Wells turbines, which receive the name of their inventor, Professor Alan Wells. These turbines have the property of rotating in the same direction regardless of the direction in which the air passes through their blades of symmetrical profile.

DESCRIPTION OF THE INVENTION

The invention proposed achieves a semi-submerged device for the use of the energy of the waves with a simple and versatile design, simplifying its manufacture and making the installation and subsequent maintenance easy, in comparison to devices existing in the state of the art. It is related to a modular system formed by at least one structural unit comprising a buoy or float attached to a rod, and a cylinder, all supported on a fixed structure consisting of a plurality of hollow vertical tubes resting on the sea bottom that will be the supporting structure, stiffeners, and a series of valves. Depending on the results that you wish to obtain, as well as the available space, there will be a greater or lesser number of modular units of the device, being able to work together with other identical units forming a structure with multiple arrangements and functions.

The small number of moving parts minimises wear and extends the life of the mechanism, since the buoy and the rod are the only moving elements of the mechanism.

The device of the invention can have on its top a platform, located above the surface of the sea, such that it can be used for a plurality of applications, such as for the creation of roads, promenades, calm bays, marinas, artificial reefs for the care of flora and fauna, and others.

The extensive travel of its rod allows it to collect the energy from the large amplitude waves, Waves greater than the design, would pass by the upper part of it without damaging it. In addition, its high damping capacity allows it to reach the total absorption of the amplitude of the wave, accumulating the energy inside of the supporting structure itself.

The device of the invention can adapt its size and number of modules to the needs, according to the different frequencies and amplitudes of waves.

The device of the invention may take different geometries and, thus, perform different functions. Thus, according to the number of units arranged it can be used as reefs, protection dams, roads, fish farms and others.

In addition, thanks to the stiffening elements, it is not necessary the mooring of the structure in the depths.

On the other hand, the set of tubes that form the supporting structure, which may vary in number and size, being a minimum of three tubes, create a protected space that can generate a natural reef with protected habitat.

DESCRIPTION OF THE DRAWINGS

To complete the description being carried out and in order to help to a better understanding of the features of the invention, in accordance with a preferred example of practical embodiment of the same, a set of drawings is attached as an integral part of said description, wherein with illustrative character and without limitation, the following has been represented.

PREFERRED EMBODIMENT OF THE INVENTION

Figure 1:
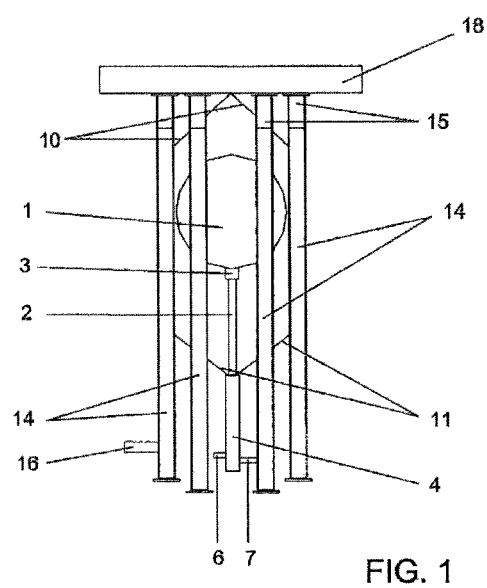
FIG. 1.—It shows an elevational view and vertical section, of a device of the invention.
Figure 2:
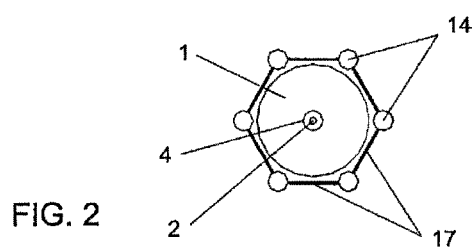
FIG. 2.—It shows a plan view in horizontal section of a device of the invention, when it has six tubes (14)

The invention described herein is related to a semi-submerged device for the use of the energy of the waves. Its small number of moving parts achieves extending its useful life and reducing its maintenance, as well as the arrangement of each one of the elements makes it possible that, in addition to fulfilling its goal of storing and harnessing the energy of the waves, it can be used for other purposes.

In this way, the semi-submerged device for the use of the energy of the waves described herein comprises a moving assembly that moves vertically inside a fixed set.

The moving assembly is formed by a buoy (1) attached to a rod (2) through a sleeve (3). This moving assembly can move through a cylinder (4) with a bushing and seal, and which is equipped with a valve (6) with filter with single-direction water inlet. Thus, when the valve is open, the water enters through it and causes the buoy (1) and rod (2) moving assembly to move upward through the cylinder (4).

The travel of the moving assembly has to be directed and delimited in some way. To do so, the fixed supporting structure has been provided, which surrounds the moving assembly, directing the movement vertically, and limiting its travel both upward and downward through limiters (10, 11). Thus, the moving assembly is located in the interior of the fixed supporting structure.

The fixed supporting structure comprises at least three vertical hollow tubes (14) resting on the sea bottom, with a length sufficient to accommodate inside the cylinder (4) and vertically direct the travel of the moving assembly, and said tubes (14) are arranged around of the buoy (1). One of said tubes (14) will be equipped with a one-way valve (7) coming from the cylinder (4), while another tube (14) shall comprise a pressurized water outlet valve (16) for its use; and each one of the tubes (14) will have an air chamber (15) in its upper part. Thus, the communication between the cylinder (4) and the tubes (14) is carried out through the valve (7). For centring the supporting structure, a centring can be arranged between the cylinder (4) and the tubes (14).

And in the same way as the tubes (14) direct the travel of the moving assembly vertically, travel limiters (10, 11) on the upper and lower parts of said tubes prevent the mobile device from exceeding said limits.

The structure of the device creates a protected space inside the same. Arranging the tubes (14) around the moving assembly protects the interior from non-controlled external actions.

In addition, since it is related to a semi-submerged device, the top of the tubes (14) is located above the water level. Thus, on said top of the tubes (14) a top platform (18) can be arranged, always above the water surface, which generates a space that can be used for a plurality of applications such as bridges, roads and others.

Another important feature of the device described in the present invention is related to its mooring to the bottom. The mooring of the structure to the bottom is not necessary, since it comprises stiffening elements (17) between each pair of contiguous tubes (14), these being the only bracing elements, providing rigidity and preventing the deformation and falling of the device structure.

Figure 5:
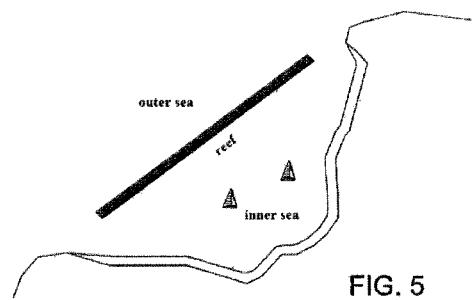
FIG. 5.—It shows a schematic view of a possible implementation of a set of devices as the one of the invention, in this case, forming an inland sea bay in calm.
Figure 6:
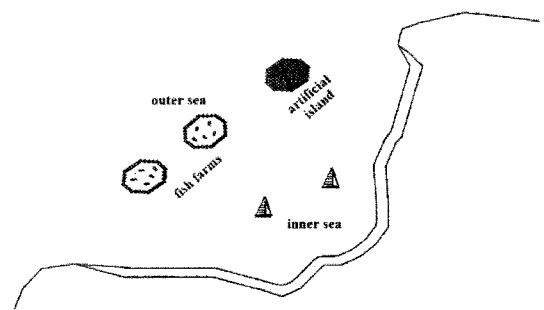
FIG. 6.—It shows a schematic view of a possible implementation of a set of devices as the one of the invention, in this case, forming artificial islands and fish farms.

In an example of practical embodiment of the invention, the described device shall comprise six tubes (14) forming a regular hexagon that defines and directs the moving assembly. A feature of the invention is that it is related to a modular device, i.e., you can place as many device units together as deemed necessary, such that bridges, roads or any other usable surface depending on the number of units arranged will be formed. By seeing FIGS. 5 and 6, we can observe different possibilities in the arrangement and implementation of several joined devices.

Figure 4:
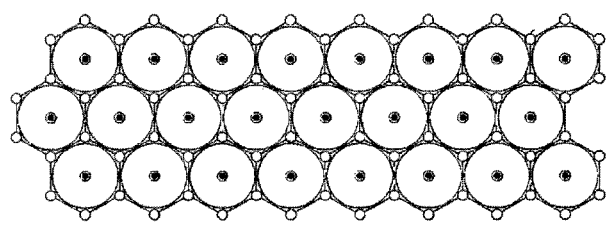
FIG. 4.—It shows a plan view and horizontal section of a set of devices of the invention, arranged in a modular way, each one of them comprising a hexagonal structure.

Preferably, all the units or devices have the same geometry in relation to the arrangement of their tubes (14). Thus, they can have the same number of tubes (14) and they can be joined through the platform (18), or they can be joined through said tubes (14) and the platform, so that each device can share one or more tubes (14) with the adjacent device. This would happen when the devices are close together, attached to each other, allowing to place a large number of devices in a small space for harnessing more the energy of the waves. In this way, an arrangement as the one shown in FIG. 4 will be achieved.

Figure 3:
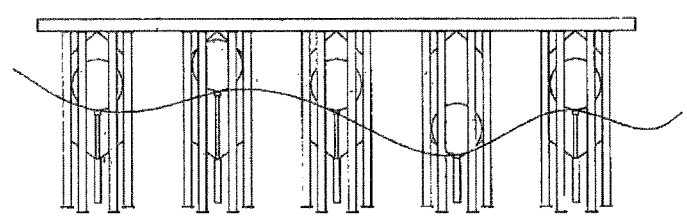
FIG. 3.—It shows an elevational view of a possible arrangement of a set of devices of the invention.

On the other hand, as it has been mentioned, when lots of units of the device are not needed, or when having enough space according to the needs, the devices may be arranged at a certain distance, increasing, in this case, the length of the platform by device unit, as shown as an example in FIG. 3.

The invention claimed is:

1. A semi-submerged device for absorbing the energy of waves, comprising at least one moving assembly formed by a buoy (1) attached to a rod (2), which moves vertically through a cylinder (4) equipped with a one-way bottom valve (6), and said moving assembly is located inside an area delimited by a fixed supporting structure comprising at least three hollow vertical tubes (14) interconnected and resting on a sea bottom, wherein one of said tubes (14) comprises an one-way valve (7), and another one of said tubes (14) comprises an outlet valve (16), and each one of said tubes (14) have an air chamber (15), at least one of said tubes (14) being connected to the cylinder (4) through the one-way valve (7).

2. The semi-submerged device for absorbing the energy of the waves, according to claim 1, wherein the area delimited by the tubes of the fixed supporting structure comprises top/bottom travel limiters (10, 11) for the buoy (1) and rod (2) moving assembly.

3. The semi-submerged device for absorbing the energy of the waves, according to claim 1, comprising a top platform (18) located on the tubes (14), wherein said platform (18) is arranged on a surface of the water.

4. The semi-submerged device for absorbing the energy of the waves, according to claim 1, comprising stiffening elements (17) between each pair of contiguous tubes (14) as the only bracing elements.

5. The semi-submerged device for absorbing the energy of the waves, according to claim 2, comprising stiffening elements (17) between each pair of contiguous tubes (14) as the only bracing elements.

6. The semi-submerged device for absorbing the energy of the waves, according to claim 3, comprising stiffening elements (17) between each pair of contiguous tubes (14) as the only bracing elements.

\* \* \* \* \*